United States Patent [19]

Ontolchik

[11] Patent Number: 4,749,926
[45] Date of Patent: Jun. 7, 1988

[54] AUTOMATIC TRIM TAB CONTROL SYSTEM

[76] Inventor: Robert J. Ontolchik, 28650 Jenkins Rd., North Olmsted, Ohio 44070

[21] Appl. No.: 72,352

[22] Filed: Jul. 13, 1987

[51] Int. Cl.$^4$ ............................................. B63H 25/02
[52] U.S. Cl. .................................... 318/588; 318/648; 33/317 D
[58] Field of Search .............. 318/588, 648; 33/317 D

[56] References Cited

U.S. PATENT DOCUMENTS 3,858,328  1/1975  La Rone ............................ 33/317 D
4,401,888  8/1983  West et al. ........................ 318/640 X Primary Examiner—William M. Shoop, Jr.
Assistant Examiner—Saul M. Bergmann
Attorney, Agent, or Firm—Fay, Sharpe, Beall, Fagan, Minnich & McKee

[57] ABSTRACT

An automatic trim control system designed to be used on power boats equipped with electric or hydraulic actuated trim tabs is disclosed. The unit senses out of trim conditions in two planes (pitch and roll) and transmits control signals to the electro-mechanical control lines to reposition the trim tab attitudes, thereby reestablishing preset trim conditions as required.

18 Claims, 11 Drawing Sheets

AUTOMATIC TRIM TAB CONTROL SYSTEM

BACKGROUND OF THE INVENTION

This application pertains to the art of marine craft stabilization, and more particularly to the art of automatic stabilization in accordance changing conditions encountered by a motorized boat while underway.

The invention is particularly applicable to automatic trim tab adjustment, and will be described with particular reference thereto, although it will be appreciated that the invention has broader applications, such as stabilization of vehicles in general through automatic parameter adjustment.

The art of automatically trimming a craft has been widely used and perfected in the aviation industry, predominately through the use of high cost gyro control systems. Attempts to apply the art to water craft have been made, but to date only large scale gyro application systems have been effective.

On small to moderate size vessels (typically 20 to 50 feet), manually operated trim tabs have been effective in setting the planing angle (pitch and roll). The problems encountered in the trimming process are significant due to constantly changing conditions.

Automatic trimming is desirable because of the constantly changing conditions which affect the pitch and roll of a vessel, i.e., changes in load, speed and sea conditions. A properly trimmed vessel increases efficiency, reduces stress on the structure and produces a smoother operation.

SUMMARY OF THE INVENTION

The present invention contemplates a new and improved trim control mechanism which overcomes all of the above-referred problems and others, and provides a means for stabilizing a water craft which is simple, economical, and readily adaptable to existing trim tab systems.

In accordance with the present invention, there is provided a first sensor means which senses displacement of a water craft about a first axis, and generates a signal indicative thereof. A second sensor means senses displacement of the craft from a second axis and generates a signal indicative thereof. These signals are individually aggregated, and are compared to preselected system characteristics. In accordance with that comparison, a signal is generated for controlling positioning of trim tabs.

In accordance with a more limited aspect of the invention, the trim tabs are positioned in such a fashion as to provide for correction while keeping drag from the tabs to a minimum.

In accordance with a yet more limited aspect of the present invention, pitch and roll of the craft are sensed, and corrections to pitch are assigned priority over corrections to roll.

In accordance with a still more limited aspect of the present invention, corrections to the trim tabs are made in intervals of a preselected duration to provide settlement time to avoid over correction.

The principle object of the invention is the provision of a method and apparatus for accomplishing stabilization of a water craft by optimal positioning of associated trim tabs.

Another object of the invention is the provision of a means for positioning the trim tabs to affect correction of the water craft while maintaining a minimum drag.

Another object of the present invention is the provision of a trim tab control mechanism which avoids over correction of parameters of an operating water craft.

DETAILED DESCRIPTION OF THE INVENTION

Figure 1:
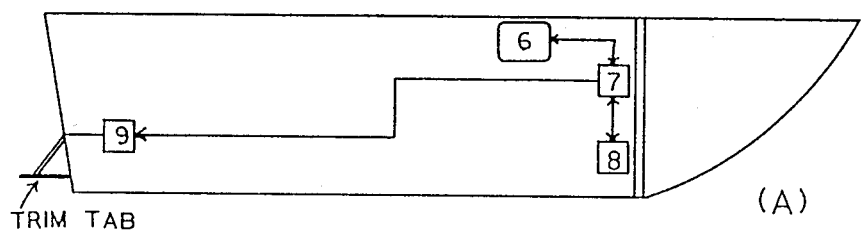
FIG. 1 is a physical layout of a typical application the present system.
Figure 1:
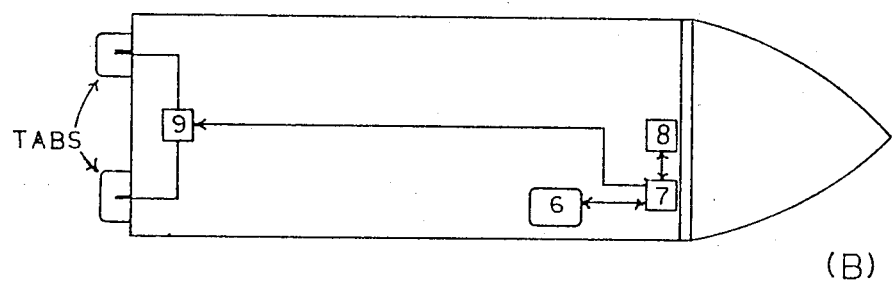

FIG. 1 shows a general system configuration mounted on a water craft comprised of a control panel 6, control electronics 7, sensor unit 8, and an trim tab control mechanism 9 which may already be provided in the craft.

Figure 2:
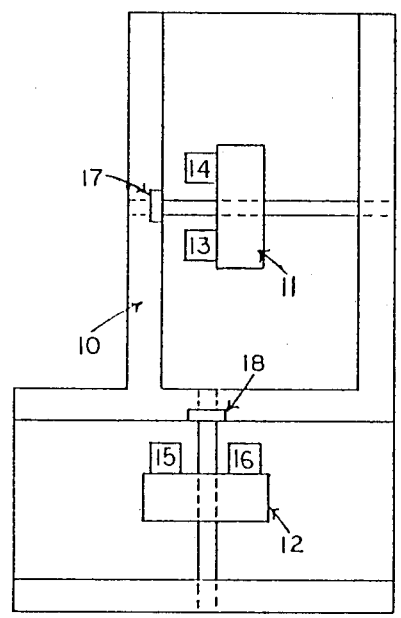
FIG. 2 is a top view of a sensor unit.
Figure 3:
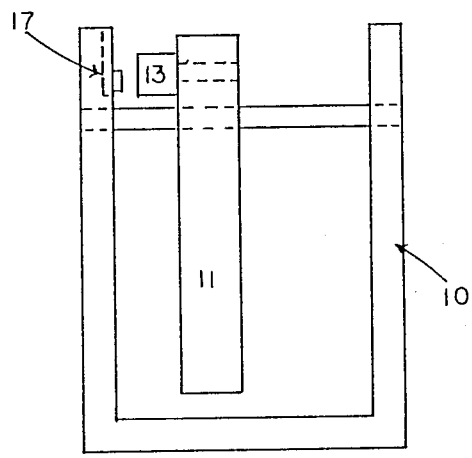
FIG. 3 is a side view of one section the sensor of FIG. 2.

Turning to FIGS. 2 and 3 a sensor apparatus for use in the disclosed system is provided. The sensing unit is designed with two stationary, linear voltage output Hall Effect sensors 17 and 18 and four magnets (two south pole 13 and 15 and two north pole 14 and 16) which are mounted on a free swinging pendulums 11 and 12. The magnets 13, 14, 15, and 16 are positioned adjacent to Hall Effect sensors 17 and 18. In the at rest condition, that is when all attitudes of the craft are in their desired positions at initialization, the magnet sets 13, 14, and 15, 16 are equally positioned on either side of Hall Effect sensors 17 and 18 respectively. The pendulums are free to rotate about their axes as the unit is titled. The sensor unit housing is preferably encased in an oil filled enclosure fixed to the craft.

The pendulum, being a gravitational device, remains relatively fixed in relation to the earth's center (or perpendiculr to the horizontal plane of the boat) while "at rest." For purposes of discussion, references to pendulum movement in relation to the sensor or movement in relation to the pendulum produces the same result. As the craft tilts off center, the pendulums 11 and 12 rotate by proportional amounts, decreasing the distance between one of the magnets (depending on the direction of tilt) and the sensor. The increase in magnetic flux produces a proportional output voltage of a magnitude determined by the tilt direction. The voltage output is suitably negative in the presence of a south pole field and positive in the presence of a north pole field.

Viscous dampening of the pendulums, which is accomplished by an oil-filled casing, is used to reduce pendulum oscillations, particularly high frequency oscillations, caused by the motion of the craft moving through the water. The voltage output is sensed by the associated electronics (FIG. 4) where it is analyzed and processed.

Figure 4:
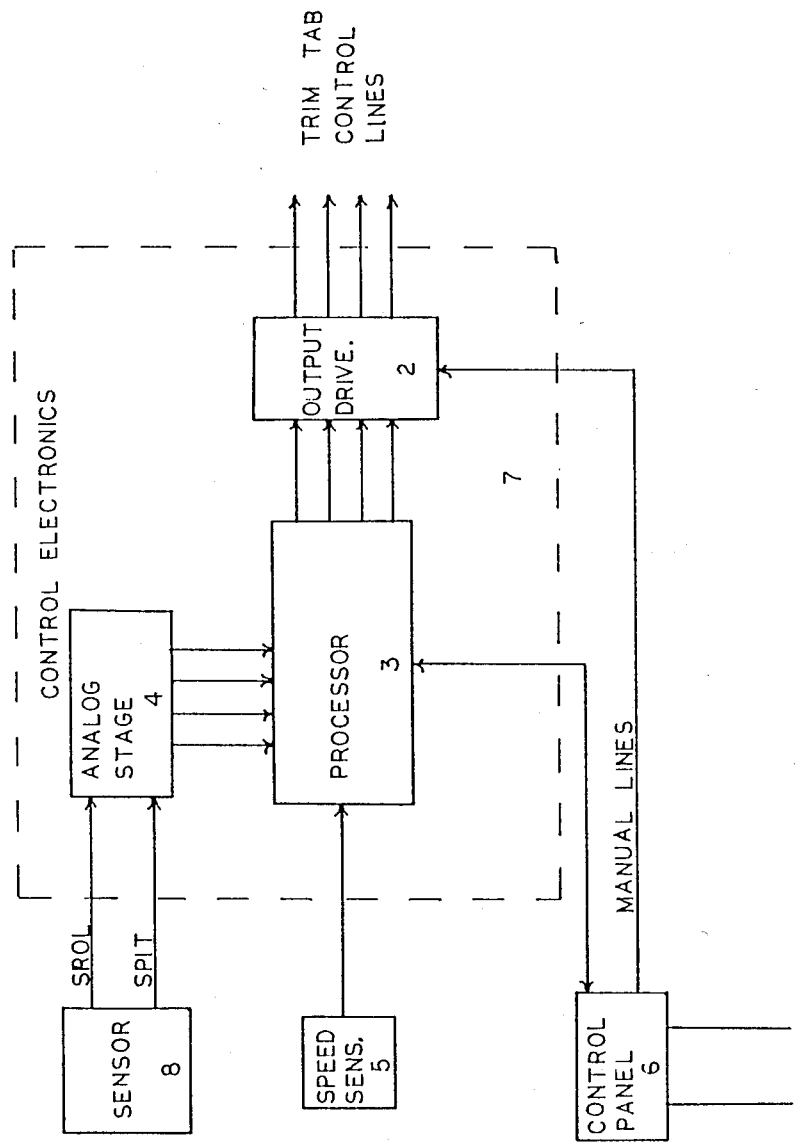
FIG. 4 is a block diagram drawing of the automatic trim tab control system.

Referring to FIG. 4, a block diagram of the control mechanism is provided. It will be seen therein that planar rotary motion of a water craft results in an analog signal SROL for roll motion, and SPIT for pitch motion. SROL may, for example, be assigned a negative potential for a starboard down roll and assigned a positive potential for a port down roll relative to a preset roll angle. SPIT, for example, may be negative for bow down and positive for bow up conditions relative to a preset pitch angle.

The analog unit 4 receives the SROL and SPIT voltage levels from the Sensor Unit 8. Two similar channels for roll and pitch sum and average, or aggregate, the positive and negative levels caused by the inherent motion of the moving boat through the water. The result of the algebraic sum is integrated and interfaced to a comparator circuit (level comparator) for digital conversion, as will be described in more detail below. The digital output of this stage is transmitted to the control logic section. It will be recalled that the viscous dampened sensors have, to some extent, already eliminated some of the boat's movements, particularly those with a higher frequency.

The processor 3 receives four signals from the analog stage 4 indicative of one of four possible conditions: port down, starboard down, bow up or bow down. In addition, the processor 3 receives speed information from an external sensor 5 which is used as an enabling function for a correction scheme. A minimum speed, preferably one of nine knots, is used as a reference speed. The processor 3 activates the output drivers 2 as required, controlling the trim tab mechanism to reestablish a preset trim condition.

Figure 5A:
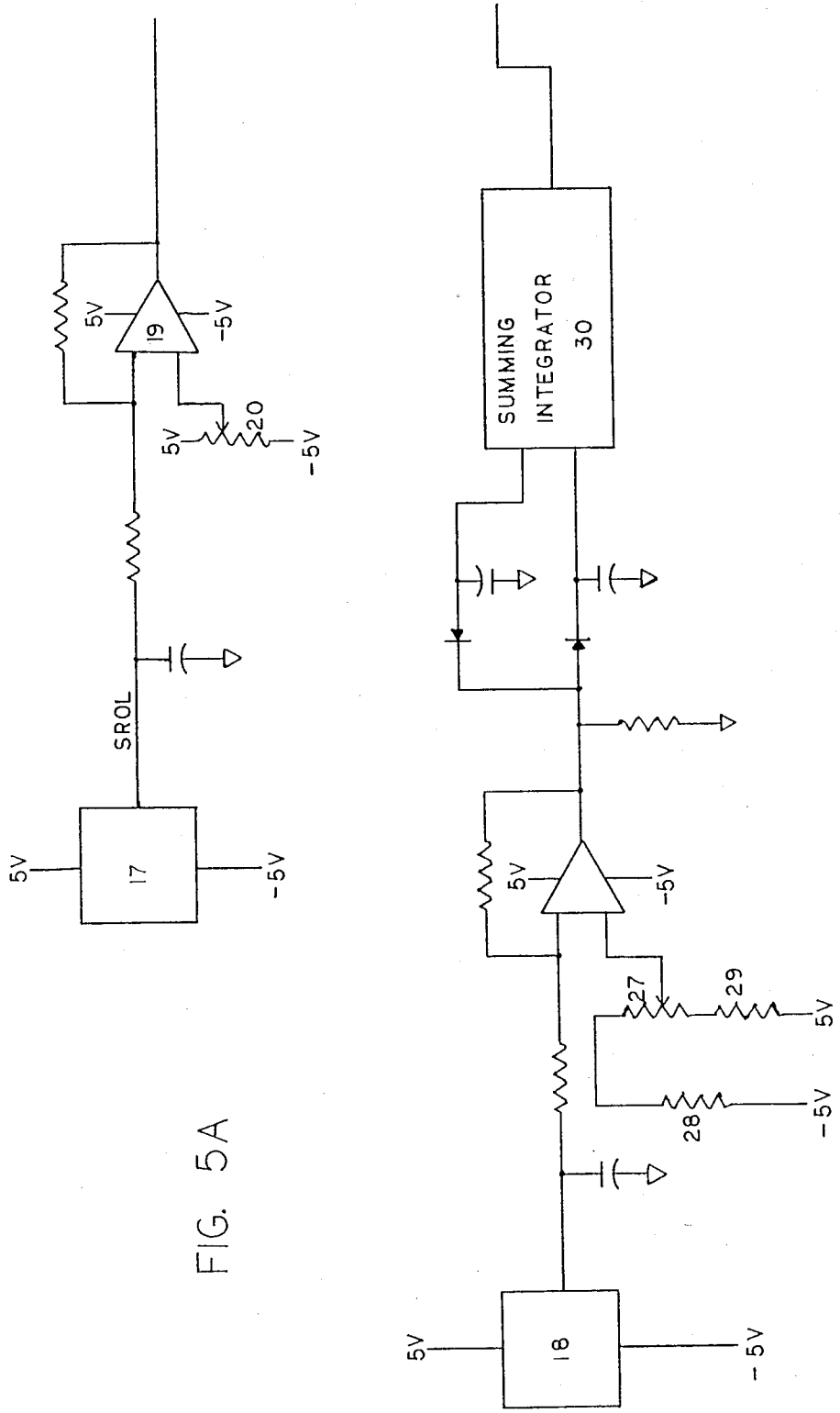
FIG. 5A is placed adjacent and to the left of FIG. 5B, and when
Figure 5B:
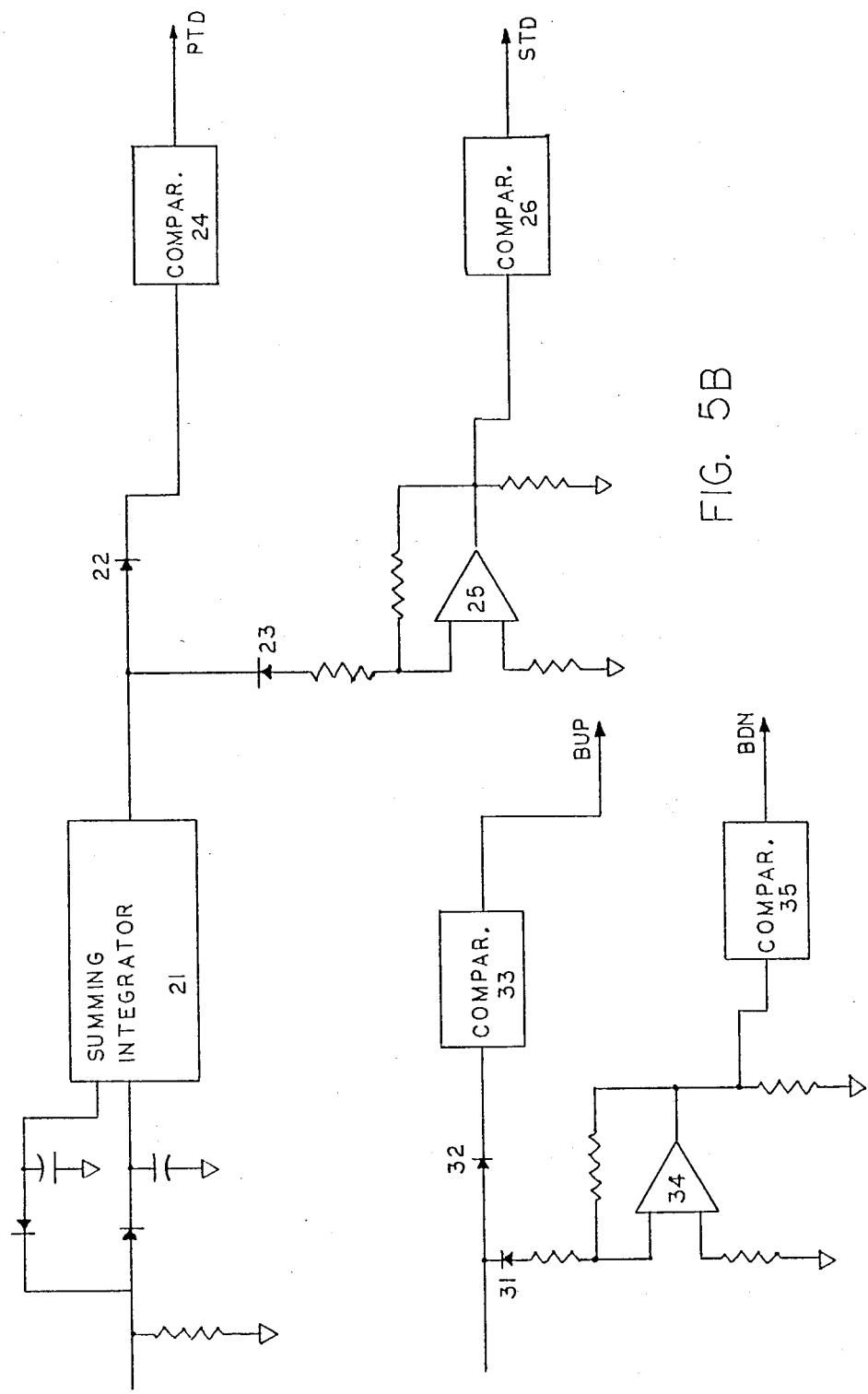
FIG. 5 is a detailed schematic drawing of analog and processor of the block diagram of FIG. 4, the interconnections being such that a first portion of the circuit is completed when
FIGS. 5C through 5G are placed adjacent one another from left to right respectively.
Figure 5C:
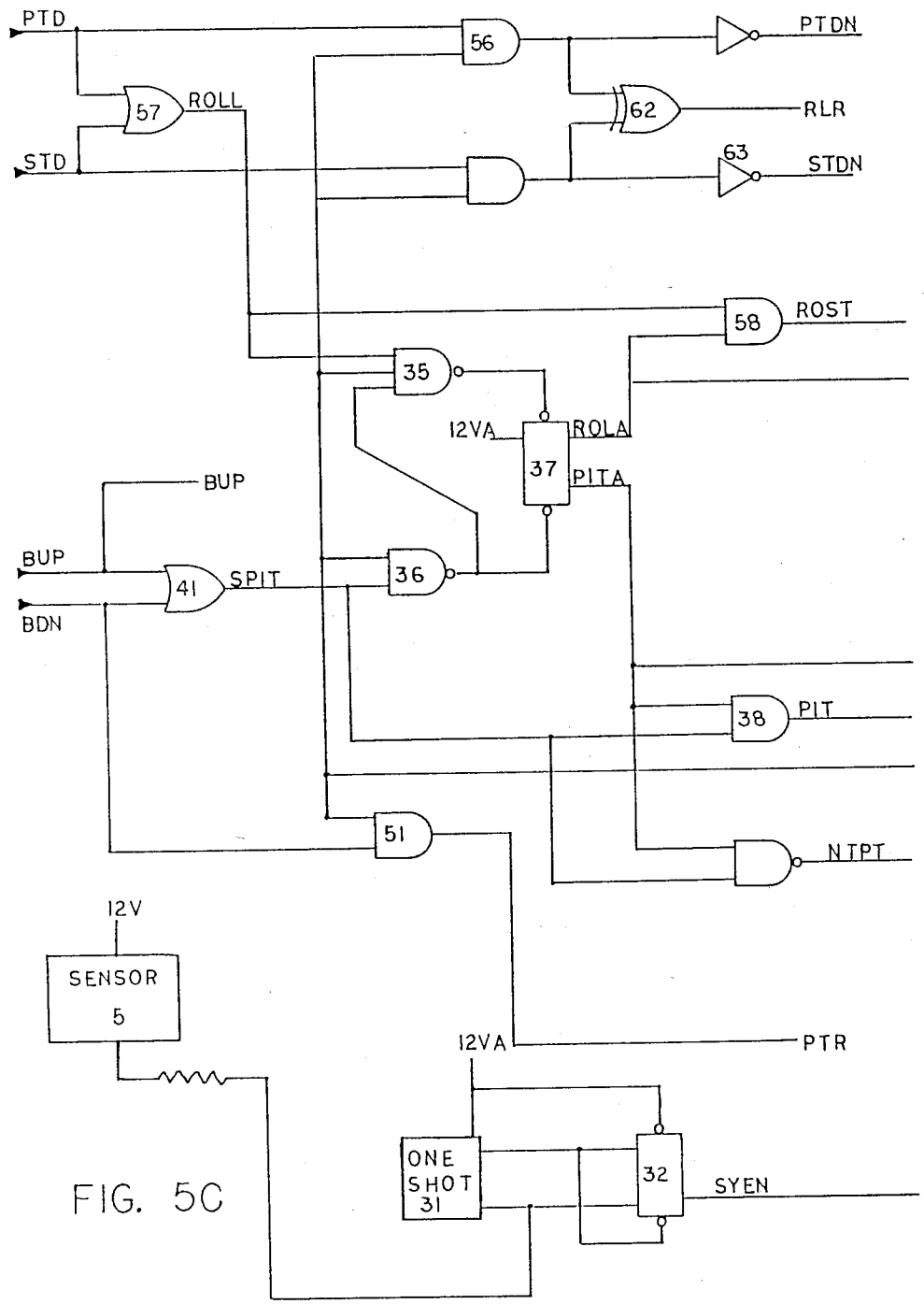
Figure 5D:
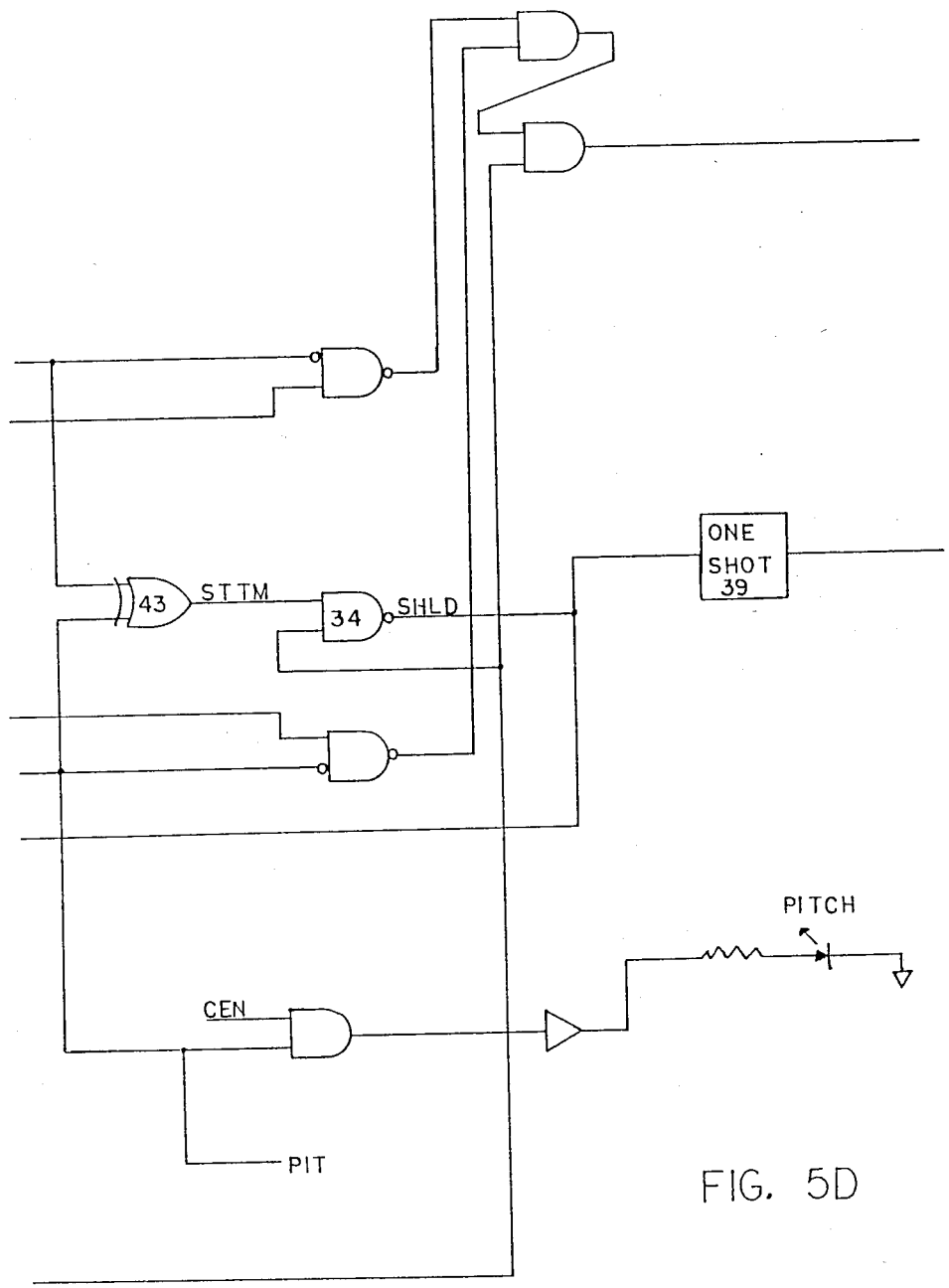
Figure 5E:
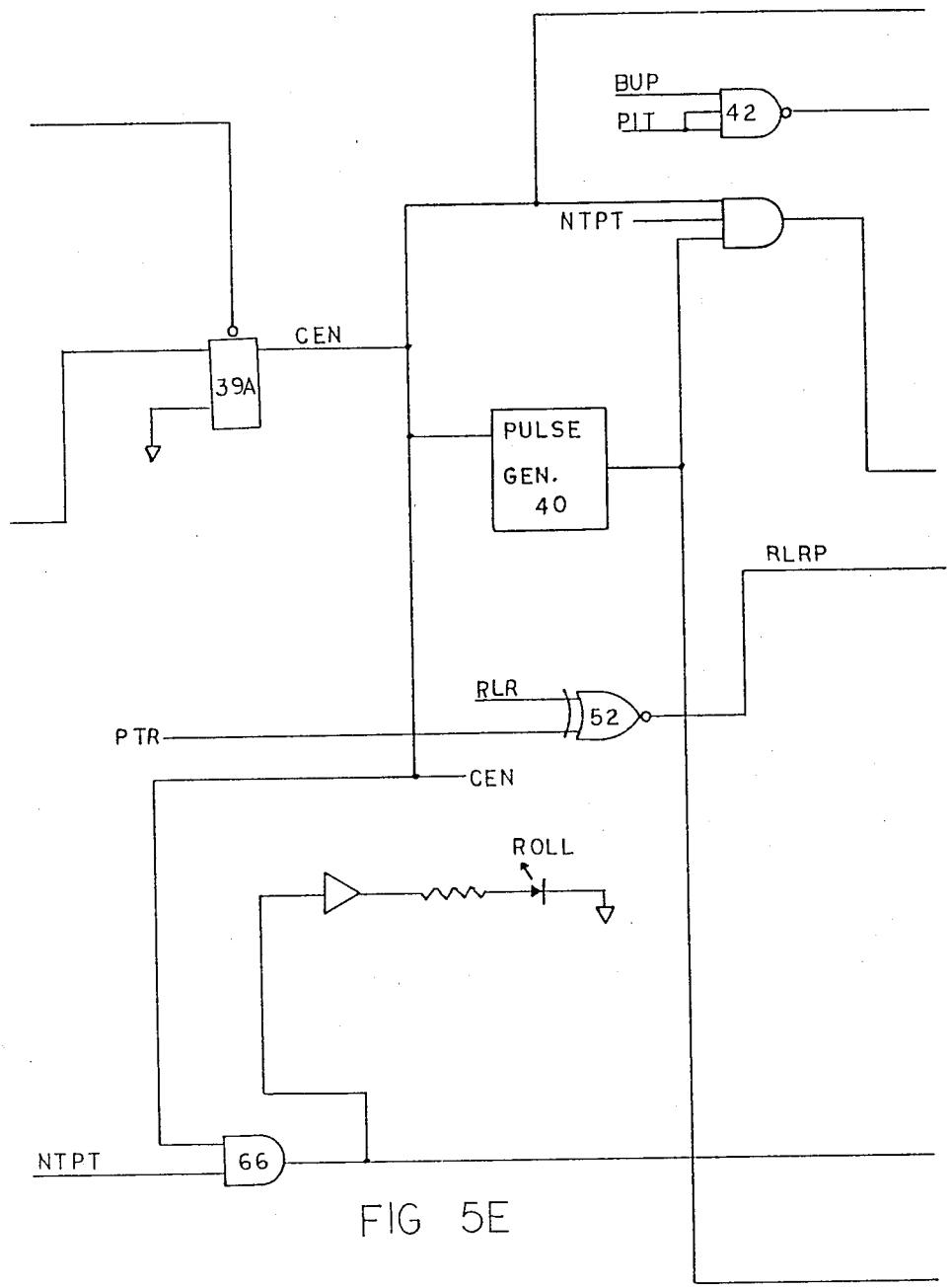
Figure 5F:
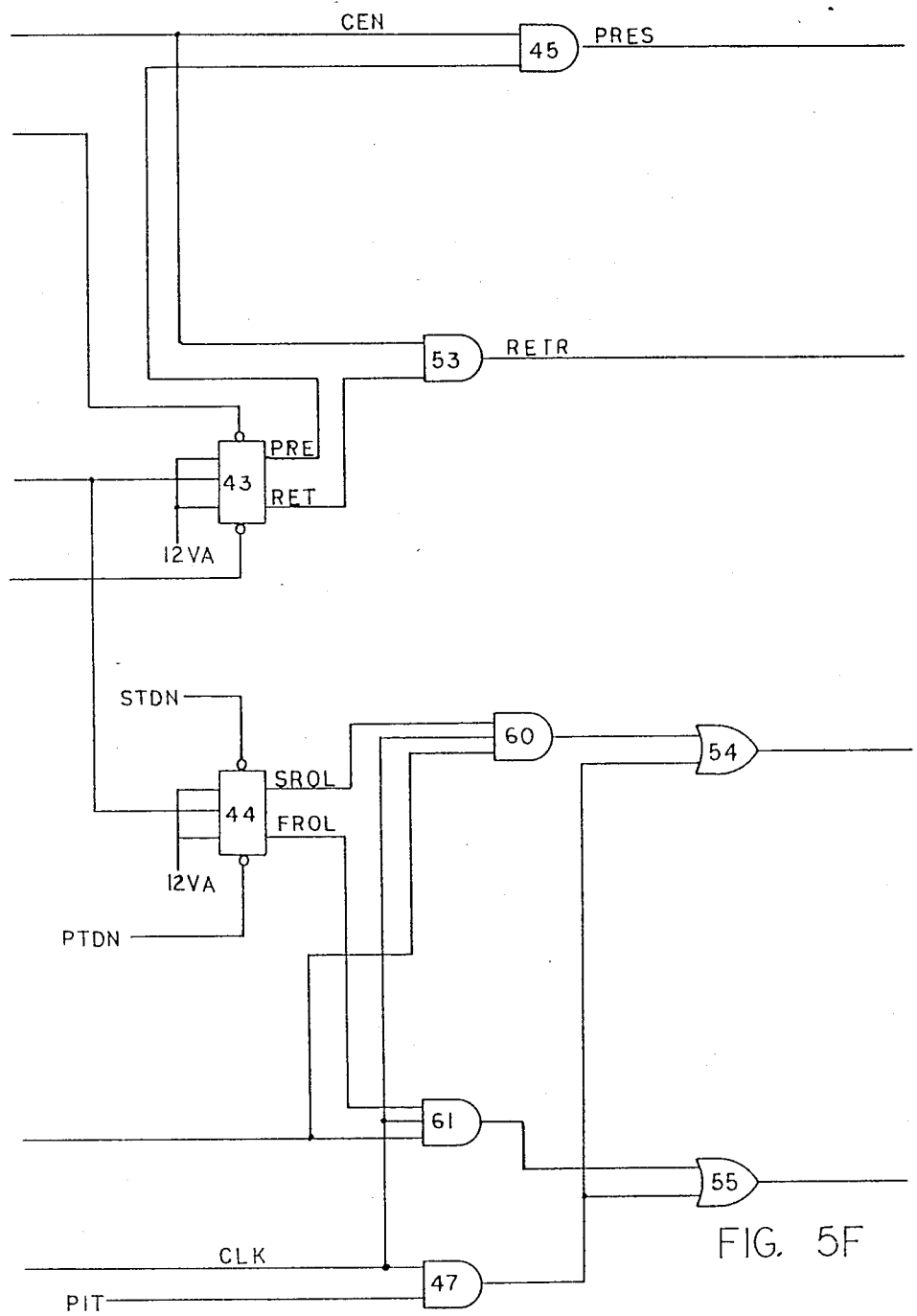
Figure 5G:
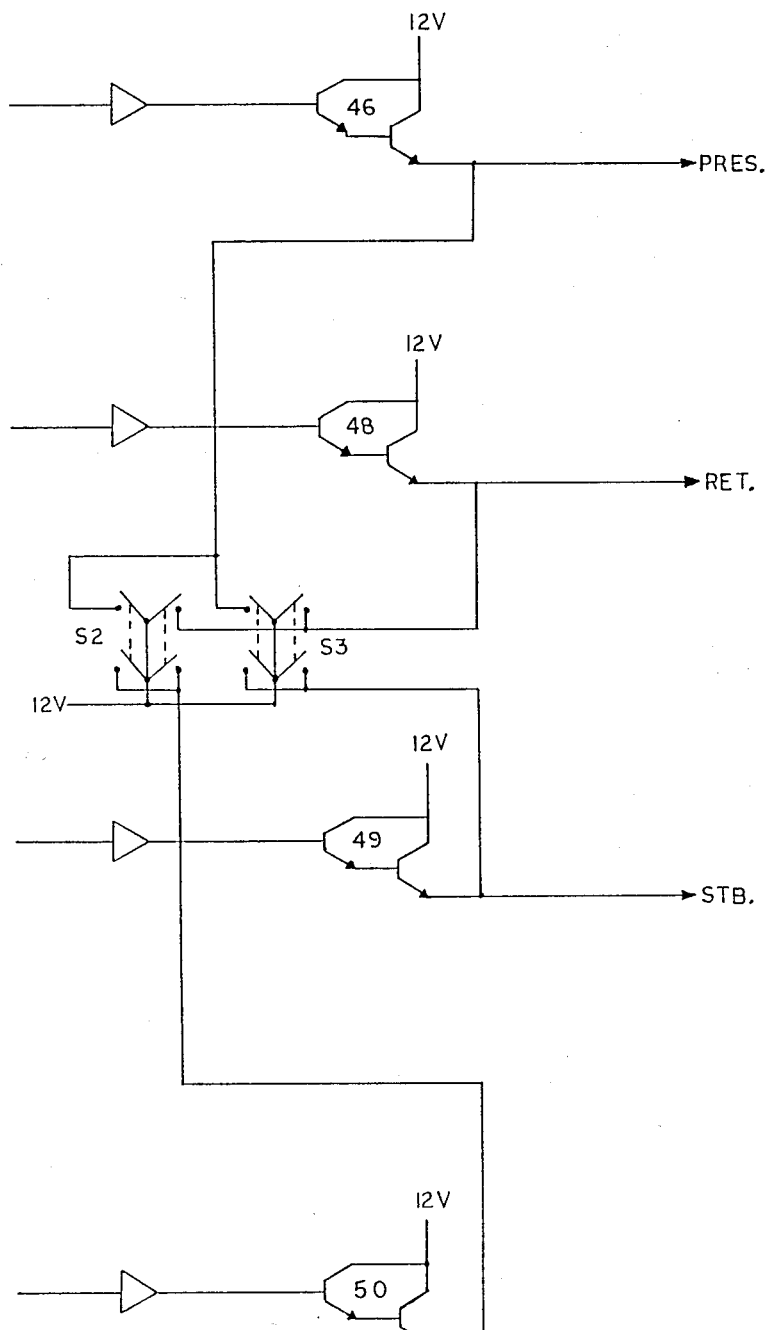

The system receives power and trim positioning information from the control panel 6. The control panel 6 also provides selection of automatic or manual operation. In the manual mode, voltage levels are sent directly to the output stage 2 via switches S2 and S3 (FIG. 5G) to control the system, thereby, bypassing the electronic processor. Preferably, the control panel 6 additionally supplies a visual indication of system operations.

FIG. 5 shows the electronic control unit of FIG. 4 in detail. The analog circuitry of FIG. 5A and 5B is divided into two channels; roll and pitch. The roll circuitry will be addressed first.

Op amp 19 and its associated components make up an inverting circuit which amplifies the output from the roll Hall Effect sensor 17. Position adjustment potentiometer 20 compensates for minor mechanical differences in sensor unit's construction and/or in the physical mounting of the unit.

As voltage inputs are received by the analog stage, the summing integrator 21 algebraically averages the positive and negative swings associated with the inherent motion of a boat under way. A composite resultant is sensed at the output of the summing integrator 21. A negative resultant indicates a starboard down (list) condition while a positive level indicates a port down (list) condition.

Steering diode 22 passes positive voltage levels to the comparator 24. This level is compared with a reference voltage in the comparator 24. If the input potential is greater than the reference voltage, a logic level high (PTD) is output from the comparator 24 indicating a port down condition.

Steering diode 23 passes the negative resultant from the summing integrator 21. Inverting op amp 25 applies a positive representation of the potential to the comparator 26. If the potential is greater than the reference voltage, a logic level high (STD) is output from comparator 26. Hence the condition starboard down is transmitted to the control logic.

The pitch circuitry is essentially the same as the roll channel with the following exceptions. Position adjust pot 27, along with limiting resistors 28 and 29, are preferably remotely located on the operators control panel. This allows a pilot to set pitch trim as desired (within the limits of the circuitry). Once the positive potential passed by diode 32 exceeds the comparator 33 reference level, a logic level high BUP is output from comparator 33. The logical high indicates a "bow up" condition to the control logic. Such a remote mounting of resister 20 is also possible, but may be less desirable.

The negative resultant of the integrator stage 30 is passed by steering diode 31 and is inverted by op amp 34. The absolute value of the negative resultant is then compared with a reference level of comparator 35. Once exceeded, a logic level high (BDN) is output from comparator 35. The condition "bow down" is transmitted to the control logic.

The trim correction schemes are established by the control logic unit (CLU) shown in FIGS. 5C, 5D, 5E, 5F, and 5G. Correction sequences are designed to reestablish trim using a minimum tab angle, thereby, producing the least amount of drag possible in all situations.

The analog stage provides the CLU with a specific out of trim condition (OTC). The logic responds to the OTC with the required trim scheme when the condition is sensed and when the signal SYEN is active.

Turning now to FIGS. 5C through 5G, SYEN is the output of the enable circuit made up of one shot 31, D flip flop (F/F) 32, and a Hall effect sensor 5 which is located on the engine. The remote engine sensing system is suitably comprised of a magnet, mounted on the crankshaft/fan pulley wheel, and a companion digital output Hall effect sensor 5. The sensor 5 is bracket mounted on the engine block adjacent to the rotational path of the flywheel magnet. During each engine revolution, the magnet passes by the Hall effect sensor providing a single pulse signal output. The frequency of the output signal is proportional to the engine RPM's. A pulse repetition decoder made up of one shot 31 and F/F 32 cause SYEN to become active, preferably when an engine speed of 2000 RPM's is achieved. This function prevents undesirable trim correction attempts below cruising speed.

When pitch and roll trim are required simultaneously, pitch corrections are given priority. Otherwise OTC's are handled on a first-in-first-out basis. Further, once a sequence has been requested (pitch or roll) it is "locked in" by the output of gate 34 (SHLD).

Priority control is established as follows. SHLD is normally high. When correction of both pitch and roll is required, ROLL high is applied to an input of gate 35 and SPIT high is applied to an input of gate 36. This causes the output of gate 36 to go low, disabling the roll correction request at gate 35 and clearing D F/F 37. At the output of F/F 37, PITA goes high while its complement, ROLA, goes low. PITA and SPIT at gate 38 causes PIT to go high activating STTM resulting in SHLD going low preventing an interruption of the sequence.

The low transition of SHLD causes the one shot 39 to transmit a one second low pulse. This pulse sets a D-edge F/F 39a causing CEN to become active. The built in delay prevents trim corrections for changes in the planing angles due to momentary shifts in load, speed or sea conditions. This, of course, functions in conjunction with the above-described viscous dampened sensors, and averaging summing integrators.

The Pulse Generator 40 is activated by CEN and puts out a series of 0.5 second high pulses with a pulse repetition frequency ("PRF") of 2.5 seconds. The pulse train drives the output logic in 0.5 second bursts. The "off" period allows a two second settling time for the boat to adjust to the change in lift.

The correction function of the disclosed circuitry will now be described in relation to specific correction schemes. Correction schemes for pitch and roll will be discussed without specific reference to the priority and hold logic addressed above. Cruising speed is assumed, making SYEN active (high).

PITCH CORRECTION

Condition: Bow Up

Signal BUP goes high at gate 41 and gate 42 forcing SPIT high. SPIT active triggers the priority and hold logic which starts the one shot 39. At gate 42, BUP and PIT are high throughout the sequence. SHLD which was high initially falls when the output of gate 34 STTM goes active. BUP and PIT active at gate 42 set the F/F 43 causing the Q output to go high. The output of the Pulse Generator 40 is precluded from changing the state of F/F 43 by the inactive signal NTPT (see FIG. 5C). CEN and PRE at gate 45 cause PRES to go high. The Darlington pair 46 thus applies a voltage to a pump pressure value in the associated trim tab mechanism.

The signals PIT and CLK are applied to gate 47 resulting in the biasing on of Darlington pairs 49 and 50. Voltage is applied to the port and starboard values in 0.5 second bursts. The tabs are lowered and the sequence continues until an on trim condition causes CEN to fall terminating the sequence.

Condition: Bow Down

A bow down sequence starts with the signal BDN going high, and this signal forms an input to gate 41. The bow down scheme follows the same logical sequence as bow up, with the exception of the conditioning of J-K F/F 43. BDN appears at gate 51 with the normally high signal SHLD. The output of gate 51 goes high at the rise of BDN, and falls 50 nanoseconds later when SHLD goes low. This pulse is inverted by gate 52 and causes the F/F 43 to be reset, forcing RET to become active. When CEN goes high, RETR is enabled at gate 53. The Darlington pair 48 is gated for appling voltage to the tab retract mechanism. The tabs are pulsed upward in 0.5 second increments by the outputs of gate 47, 54, 55, and the associated output driver pairs 49 and 50.

The combination of PIT and CLK provide the desired burst operation of the tabs. PIT remains active while the pitch out of trim condition exists. The sequence is terminated by the fall of CEN and PIT when an on trim condition is sensed.

ROLL CORRECTION

Condition: Port Down

Signal PTD from the analog stage is transmitted to gates 56 and 57. The output of gate 56 stays high for 50 nanoseconds (the amount of time taken for SHLD to change to a low state). The result is a low pulse out of gate 52 (RLRP) required to reset the F/F 43 and a high pulse (PTDN) used to reset J-K F/F 44. These reset pulses condition the logic for the "port down" correction operation.

The output of gate 57 (ROLL) becomes active to signal the presence of and OTC in the roll plane. ROLL in combination with an inactive SHLD (high) and the inactive output of gate 36 (indicating that the pitch correction lines are inactive) sets the F/F 37. This action enables the hold circuitry and locks in the roll correction mode. ROLL and ROLA at gate 58 result in ROST high. ROST is sensed at gate 67 causing STTM to become active. The combination of STTM and SYEN cause the output of gate 34 (SHLD) to go low. SHLD inhibits pitch correction signals from interrupting the sequence. The transition of SHLD to a low level triggers one shot 39 to produce a one second low pulse which sets F/F 39a causing CEN to become active enabling the correction sequence logic and starting the Pulse Generator 40.

The first clock pulse puts a 0.5 second high level on gate 61. The combination of FROL, CLK and high output of gate 66 results in a high level on the output of gate 61 which turns on the Darlington pair 50. Voltage is thus applied as the starboard correction value.

CEN and RET at gate 53 cause the output of the Darlington pair 48 to apply voltage to the pump retract mechanism of the trim tab adjustment mechanism. The combination of the pump retract operation and the enabling of the starboard valve cause the starboard trim tab to be retracted (move upward) for 0.5 seconds.

The fall of CLK stops the tab movement and causes the F/F's 43 and 44 to change states, resulting in PRE and SROL beccomming active. The next high clock pulse results in high levels at the inputs of gate 60. High levels are also at the inputs of gate 45. The outputs of gates 45 and 60 in turn cause the port trim tab to move downward for 0.5 seconds.

This correction sequence continues until an "on trim" condition is sensed and the enable signals PTR and CEN fall, terminating the operation.

Condition: Starboard Down

The starboard down correction sequence begins with the signal STD from the analog section. The sequence follows the same logic as the port correction scheme with the exception of the first conditioning signals. Only the differences will be discussed in detail.

STD results in a 50 nanosecond positive pulse at gate 62 which is inverted by gate 52 to preset F/F 43 causing RET to go high. A negative 50 nanosecond pulse out of gate 63 (STDN) is transmitted to gate 44 to set the F/F causing SROL to go high.

The first high pulse out of the Pulse Generator 40 with SROL and the high output of gate 66 causes the output of gate 54 to become active resulting in voltage applied to the starboard valve of the tab adjustment mechanism through the Darlington pair 49.

CEN and RET cause the pump retract mechanism to become active. The combination of these actions will cause the port trim tab to move upward for 0.5 seconds. The fall of the clock pulse causes the logic to sequence. The next positive pulse enables the logic to lower the starboard tab for a period of 0.5 seconds.

The sequence is continued until an "on trim" condition results in the fall of PTR and CEN, disabling the clocks and the output logic.

The invention has been described with reference to a preferred embodiment thereof. Obviously, modifications and alterations will occur to others upon reading and understanding of this specification. It is my intention to include all such modifications and alterations insofar as they come within the scope of the following claims, or the equivalents thereof.

Having thus described the invention, it is now claimed:

1. An automatic trim control mechanism comprising:
   first sensor means for sensing displacement of an associated craft about a first axis;
   second sensor means for sensing displacement of the associated craft about a second axis;
   means for generating a first set of signals indicative of displacement sensed by the first sensor means;
   means for generating a second set of signals indicative of displacement sensed by the second sensor means;
   means for generating a first composite signal indicative of an aggregation of a plurality of signals from the first set;
   means for generating a second composite signal indicative of an aggregation of a plurality of signals from the second set;
   means for comparing the first composite signal to a first preselected level to determine a first correction signal;
   means for comparing the second composite signal to a second preselected level to determine a second correction signal;
   adjustment means for varying a trim tab attitude in conjunction with at least one correction signal;
   timer means for selectively enabling the first and second adjustment means to provide adjustment periods of a preselected duration; and
   a means for sensing a status of a velocity of the craft, means for generating a velocity signal indicative of the status, and means for controlling the first and second correction signals in accordance with the velocity signal.

2. The automatic trim control mechanism of claim 1 further comprising means for setting at least one of the first and second preselected levels.

3. The automatic trim control mechanism of claim 2 wherein the first sensor means includes a first gravitational sensor for sensing planar displacement of the first axis, wherein the second sensor means includes a second gravitational sensor for sensing planar displacement of the second axis.

4. The automatic trim control mechanism of claim 3 wherein the gravitational sensors are viscous dampened pendulums.

5. The automatic trim control mechanism of claim 4 wherein individual signals of the first and second signal sets have a first polarity indicative of displacement of one direction from vertical and a complementary polarity indicative of displacement in a complementary direction from vertical.

6. The automatic trim control mechanism of claim 5 wherein the aggregations are accomplished by a summing integrator.

7. The automatic trim control mechanism of claim 6 wherein the first axis is chosen so as to be indicative of pitch and second axis is chosen so as to be indicative of roll.

8. The automatic trim control mechanism of claim 7 further comprising first and second electrically positionable trim tabs positionable in accordance with said first and second adjustment means.

9. The automatic trim control mechanism of claim 1 wherein the velocity signal masks the first and second correction signals until a preselected level of the velocity signal is exceeded.

10. An automatic trim tab control mechanism for use with an associated water craft comprising:
    first pendulum sensor means for generating a pitch status signal indicative of displacement of a first axis of the associated water craft from vertical in a generally first plane;
    second pendulums sensor means for generating a roll status signal indicative of displacement of a second axis of the associated water craft from vertical in a generally second plane;
    means for generating a velocity signal indicative of velocity of the associated water craft;
    means for comparing the pitch status signal, the roll status signal, and the velocity signal to preselected characteristics; and
    means for supplying an intermittent control signal for varying attitudes of associated first and second trim tabs in accordance with the comparison.

11. The automatic trim tab control mechanism of claim 10:
    wherein each of the first and second pendulum sensor means generate first and second signal sets respectively;
    each signal of the sets have a first polarity indicative of displacement of one direction from vertical and a complementary polarity indicative of displacement in a complementary direction from vertical;
    and further comprising means for generating a first control signal in accordance with an aggregation of signals of the first set, generating a means for signals of the second set, the intermittent control signal further being supplied in accordance with the summations.

12. The automatic trim tab control mechanism of claim 11 further comprising at least one electrically positionable trim tab positionable in accordance with said intermittent control signal.

13. The automatic trim control mechanism of claim 11 further comprising means for varying the control signal in accordance with a minimum drag position one associated trim tab, which will satisfy desired operating parameters of the associated water craft.

14. A method of controlling attitudes of trim tabs comprising the steps of:
    (a) generating a first signal indicative of planar displacement of a first axis of an associated water craft from vertical;
    (b) generating a second signal indicative of planar displacement of a second axis of the water craft from vertical;
    (c) generating a velocity signal indicative of velocity of the associated water craft;
    (d) comparing at least one of the first, second, and velocity signals to at least one preselected system characteristic;
    (e) generating a trim tab control signal as a result of the comparison; and
    (f) intermittently applying the trim tab control signal to at least one associated positionable trim tab.

15. The method of claim 14 further comprising the step of summing the first signal over a time period to acquire a first integrated signal, and additionally comparing the integrated signal to the preselected system characteristics in step (d).

16. The method of claim 15 further comprising the step of correcting pitch conditions of an associated water craft by positioning of the associated trim tab, prior to corrections of roll conditions thereof.

17. The method of claim 16 further comprising the step of varying a preselected-system characteristic in accordanc with desired performance criteria.

18. The method of claim 17 further comprising the steps of calculating a minimum drag position of the associated trim tab which will coincide with the desired performance criteria, and varying the control signal in accordance therewith.

* * * * *